United States Patent
Coatney et al.

(10) Patent No.: US 7,594,134 B1
(45) Date of Patent: Sep. 22, 2009

(54) DUAL ACCESS PATHWAYS TO SERIALLY-CONNECTED MASS DATA STORAGE UNITS

(75) Inventors: Sue Coatney, Sunnyvale, CA (US); George Kong, Sunnyvale, CA (US); Doug Coatney, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 401 days.

(21) Appl. No.: 11/503,716

(22) Filed: Aug. 14, 2006

(51) Int. Cl.
*G06F 11/00* (2006.01)
(52) U.S. Cl. ........................................... 714/3
(58) Field of Classification Search ................. 714/2–7, 714/11–13, 15, 20, 42, 54
See application file for complete search history.

(56) References Cited

U.S. PATENT DOCUMENTS

| | | | | |
|---|---|---|---|---|
| 5,113,496 A | * | 5/1992 | McCalley et al. | 710/305 |
| 5,757,642 A | * | 5/1998 | Jones | 700/5 |
| 5,838,891 A | * | 11/1998 | Mizuno et al. | 714/5 |
| 6,128,750 A | * | 10/2000 | Espy et al. | 714/7 |
| 6,728,897 B1 | | 4/2004 | Cramer et al. | |
| 6,748,510 B1 | | 6/2004 | Coatney | |
| 6,809,505 B2 | * | 10/2004 | Peeke et al. | 324/66 |
| 6,920,580 B1 | | 7/2005 | Cramer et al. | |
| 6,948,012 B1 | | 9/2005 | Valin et al. | |
| 7,039,828 B1 | | 5/2006 | Scott | |
| 7,320,083 B2 | * | 1/2008 | Davies et al. | 714/3 |
| 2002/0069317 A1 | * | 6/2002 | Chow et al. | 711/104 |
| 2003/0120743 A1 | | 6/2003 | Coatney et al. | |
| 2005/0102549 A1 | * | 5/2005 | Davies et al. | 714/4 |
| 2005/0278581 A1 | * | 12/2005 | Jiang et al. | 714/40 |

OTHER PUBLICATIONS

Network Appliance, *Clustered Failover High-Availability Solution*, Internet: http://www.netapp.com/products/software/clustered.html, Jun. 8, 2006, 3 pages.

* cited by examiner

*Primary Examiner*—Nadeem Iqbal
(74) *Attorney, Agent, or Firm*—John R. Ley

(57) ABSTRACT

A group of data storage units are serially connected in a sequential data communication path to communicate read and write operations to first and second interfaces of each data storage unit in the group. A data management computer device ("filer") manages read and write operations of the data storage units of the group through an adapter of the filer. Main and redundant primary communication pathway connectors extend from the filer to the interfaces of the data storage unit, thereby establishing redundancy through multiple pathways to communicate the read and write operations to the data storage units of the group. Main and redundant secondary communication pathway connectors extend from partner filers to the groups of data storage units associated with each partner filer, thereby further enhancing redundancy.

40 Claims, 5 Drawing Sheets

DUAL ACCESS PATHWAYS TO SERIALLY-CONNECTED MASS DATA STORAGE UNITS

CROSS-REFERENCE TO RELATED INVENTIONS

This invention is related to the following other inventions, all of which are assigned to the assignee of the present invention: "System and Method of Implementing Disk Ownership in Networked Storage," described in US patent application publication US 2003/0120743, published Jun. 26, 2003; "Negotiated Graceful Takeover in a Node Cluster," described in U.S. Pat. No. 6,920,580, issued Jul. 19, 2005; "System and Method for Verifying Disk Configuration," described in U.S. Pat. No. 6,748,510, issued Jun. 8, 2004; and "System and Method for Clustered Failover without Network Support," described in U.S. Pat. No. 7,039,828, issued May 2, 2006. The disclosures of these inventions are incorporated herein by this reference.

FIELD OF THE INVENTION

This invention relates to the mass storage of data for use by a computer system. More particularly, the invention relates to a new and improved method and apparatus for providing dual pathways for accessing serially-connected data storage units, to maintain high availability, performance and reliability in data communication with the data storage units without significant additional cost under conditions of unanticipated failures in connectivity or communication with the data storage units.

BACKGROUND OF THE INVENTION

The widespread use of modern computer systems has made it a necessity to assure continual and immediate access to enormous amounts of information or data. The inability to provide access to the data, even for a short amount of time, can have catastrophic consequences. Consequently, modern computer systems utilize mass data storage configurations which provide redundancy to assure a high level of availability of and access to the data while simultaneously guarding against the loss of the data. The redundancy may take many different forms.

One form of redundancy generally involves making multiple copies of the data, which is sometimes referred to as mirroring. The copy of the data is available for use quickly if the primary copy of that data is corrupted or becomes inaccessible. Redundancy may also be achieved by the use of mathematical techniques which enable the entire data to be defined mathematically without completely copying the data. Mathematical algorithms permit the data to be reconstructed if the copy of the complete data becomes unavailable. One of the principal types of data storage configurations which are widely used to assure duplicate copies of the data is any one of the well-known types of Random Array of Independent or Inexpensive Disks (RAID) mass storage configurations.

The redundancy to assure access to the data is typically achieved by using multiple copies of the components necessary to communicate read and write data management operations between data storage units and one or more data management computer devices. A data management computer device manages and controls the data communication operations to and from the data storage units with typical read and write operations or commands, as well as performing other data management and integrity functions invoked by executing data storage operating system software. An example of a data management computer device is a traditional file server, although a data management computer device is also capable of managing data communications with respect to blocks of data as well as files of data, as might occur in a storage attached network or a fiber attached network. Each such data management computer device is referred to herein as a "filer." One technique of assuring multiple redundant communication pathways to mass storage units is a clustered failover configuration of filers and data storage units, is described in greater detail in the above-identified US patents and applications.

In a clustered failover configuration, two or more filers are associated with one another in a principal and partner or backup configuration. Each of the filers has at least one and typically a multiplicity of data storage units connected to it in a manner which permits the filer to manage its normal read and write data operations with those principally associated data storage units. The data storage units are connected to each filer in a serial configuration or in a connection which it establishes serial-like communication, typically by using serial connectivity links with and between serial interface adapters. Such a serial connectivity is desirable to implement a high volume data transfer protocol such as the well-known fibre channel protocol. In general, a serial connection permits a greater amount of data to be managed by the filer, as compared to a parallel or bus-type connection of the data storage units to the filer. Each filer is typically connected as a node of a data communication network, which allows data processors (referred to herein as "clients") that form other nodes on the data communication network, to access each of the filers for the purpose of reading and writing data to and from the data storage units managed by each filer.

Should an unanticipated failure of a principal filer occur, the partner or backup filer assumes responsibility for managing the data storage units which are normally managed by the principal filer. Management by the partner filer is achieved through an alternative connection from the partner filer to the serially connected data storage units which are normally managed by the failed principal filer, thereby allowing the partner filer to commence managing the read and write operations to those data storage units normally managed by the principal filer. In addition, the partner filer continues managing the read and write operations to those data storage units principally associated with the partner filer itself.

The event of the partner filer assuming responsibility for managing the data storage units normally associated with the failed principal filer is called a "failover," indicating that the partner filer has taken over the serving operations of the failed principal filer. While a failover results in some reduction in performance, caused by the partner filer having to manage the read and write operations associated with the data storage units of two filers, redundancy is achieved because the data remains available and accessible due to the failover functionality performed by the partner filer. After the problem that caused the failover has been corrected, it is necessary to perform certain manual and software procedures to restore the now-functional principal filer to its normal operating status and to conform the data transactions handled during failover by the partner filer into a form which can be assumed and recognized by the restored principal filer. Thus, even though a failover in a clustered mass storage configuration preserves data availability and accessibility, it is still desirable to avoid a failover condition altogether, if possible, because of the performance-diminishing effects on the partner filer and the added effort required to restore the mass storage system to its normal operating status.

Even though the cluster failover configuration of multiple filers secures the advantages of redundancy in data availability and accessibility in the series-connected data storage units, complete communication pathway accessibility or connectivity to all of the data storage units has not been possible. The principal and partner filers are connected by one connection to the data storage units, and the availability of communications to the other serial-connected data storage units depends on maintaining the integrity of the cables which connect the storage units in the serial configuration. A broken or disconnected cable between two of the individual serially-connected data storage units, or a failure of a serial connection interface to one of the data storage units, or even a disconnected or failed disk drive device within one of the individual data storage units, can have the consequence of disabling one or more of the data storage units which are serially connected to either the principal or the partner filer.

In those circumstances where completely redundant connectivity to each of the data storage units is required or desired, a fiber switch has been used to connect all of the data storage units in a selectable matrix-like configuration between both the principal and partner filers. The matrix-like switching capability of a fiber switch allows connectivity to be established with any of the data storage units. The fiber switch assures a direct connectivity path from the principal and partner filers to each one of the individual data storage units, should there be a failure in the normal, high-volume, serial-connectivity configuration between each of the data storage units in the cluster.

While the matrix-like connectivity available from a fiber switch assures reliable connectivity between each filer and each individual data storage unit, fiber switches are relatively expensive. In fact, the expense of fiber switches is so significant that some users may be deterred from obtaining the benefits of redundancy in connectivity. Moreover, because the data communication performance by use of a fiber switch is less than the data communication performance achievable by use of the serial connectivity using a fibre channel protocol, the fiber switch can not be used as a substitute for the higher performance serial connectivity in high performance mass storage systems. Thus, both the serial channel connectivity and the fiber switch matrix connectivity must be employed for maximum redundancy, and the use of both connectivity configurations increases the cost of mass storage systems.

SUMMARY OF THE INVENTION

This invention creates multiple redundant pathways between filers and serially-connected data storage units associated with those filers. As a consequence, an elevated level of redundancy in connectivity to the serially-connected data storage units is achieved. That elevated level of redundancy in connectivity is substantially comparable to the level of redundancy achieved by the use of a fiber switch, but without incurring the additional expense of a fiber switch. Moreover, the multiple redundant pathways reduce the circumstances under which a failover occurs, thereby preserving the intended performance characteristics of the mass storage system. The cost to implement the present invention is minimal, thereby avoiding the circumstance where increased costs, such as those associated with a fiber switch, have led to a decision to utilize less redundancy in a mass storage system than would otherwise be desired.

In accordance with these and other features, one basic aspect of the invention relates to a mass data storage system which comprises a group of data storage units that are serially connected in a sequential data communication path in which read and write operations are communicated among all of the data storage units in the group. Each data storage unit includes at least one data storage device which stores data. Each data storage unit also includes first and second interfaces to communicate the read and write operations to each data storage device in the group. A filer manages read and write operations of the data storage units in the group through an adapter of the filer. Main and redundant primary communication pathway connectors extend from the adapter of the filer to interfaces of the data storage unit. The main and redundant primary communication pathway connectors establish redundancy through multiple pathways to communicate the read and write operations to the data storage units in the group, despite a failure in one of the primary communication pathways or a failure in an interface or controller of a data storage unit or a failure in connectivity or functionality of a data storage device within a data storage unit. In addition, the need to fail over to the backup filer is minimized. The multiple redundant primary communication pathways provide access to the data storage units in the group under circumstances where no access would have been possible previously, except by executing a failover.

Other features of the invention also involve establishing main and redundant secondary communication pathways to the group of data storage units with connectors extending from the adapter of a second or partner or backup filer to the interfaces of the data storage units in the group. Under conditions of failover, the main and redundant secondary communication paths from the partner filer to the group of data storage units permit continued operation even if one of the secondary communication pathways should fail.

These features are further enhanced by connection arrangements of the primary and secondary communication pathway connectors to different ones of the interfaces of the data storage units within the group, to increase the possibility that one of the main or redundant communication pathways will maintain communication with all of the data storage units in the group and the data storage devices within each data storage unit. These enhancements are also achieved by establishing similar connections between two groups of data storage units and two filers. Each group of data storage units is principally associated with one of the filers and is secondarily associated with the other filer which functions as a partner or backup filer, thereby creating a cluster. In this manner, each of the two filers has redundant primary communication pathways to the group of data storage units with which it is principally associated and also has redundant secondary communication pathways to the group of data storage units for which it serves as the partner or backup filer.

Another aspect of the invention involves a method of enhancing the redundancy of a mass data storage system which involves performing the functionality described above.

A more complete appreciation of the scope of the present invention and the manner in which it achieves the above-noted and other improvements can be obtained by reference to the following detailed description of presently preferred embodiments taken in connection with the accompanying drawings, which are briefly summarized below, and by reference to the appended claims.

DETAILED DESCRIPTION

Figure 1:
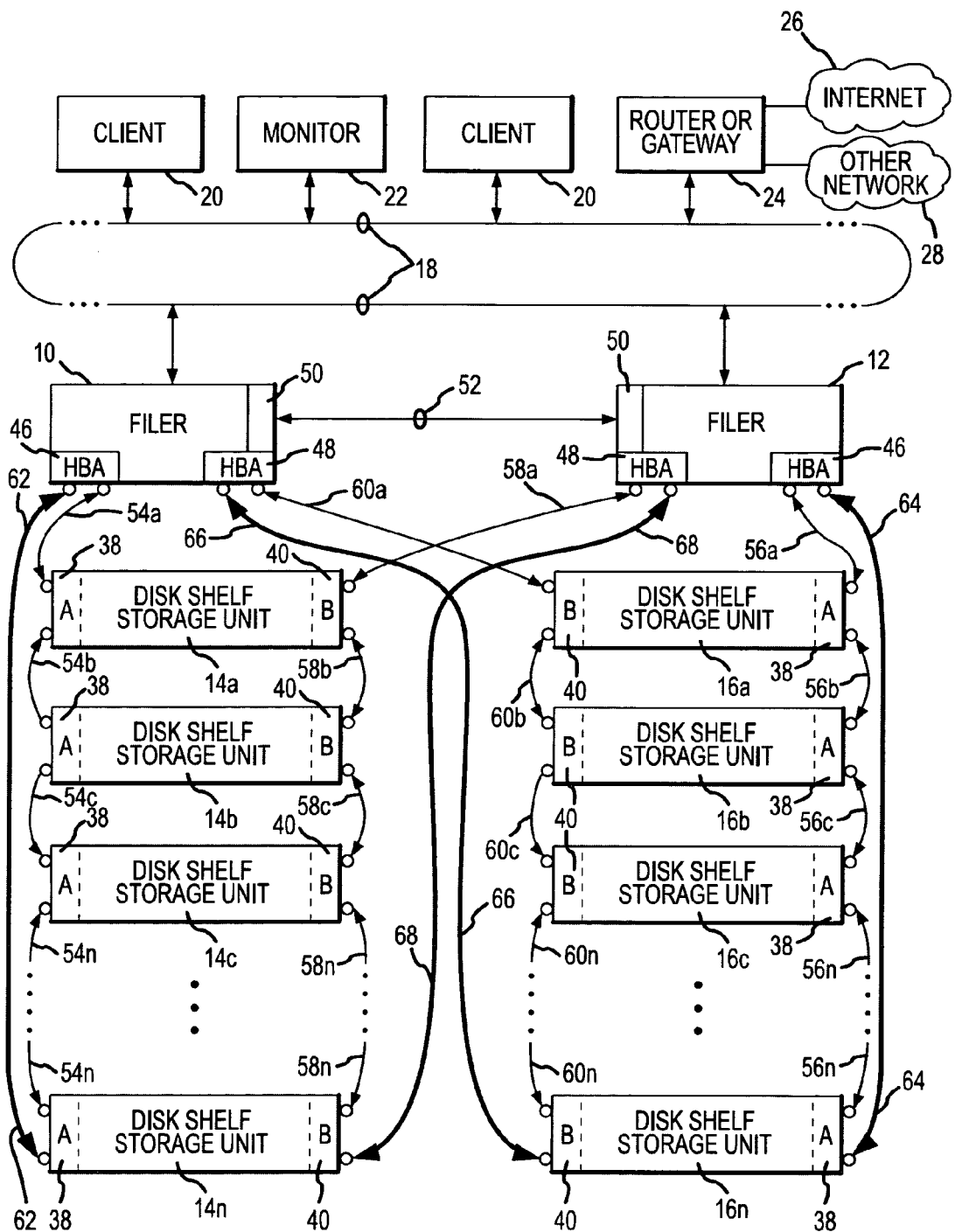
FIG. 1 is a block diagram of a pair of filers and two groups of data storage units which have been connected in accordance with the present invention in a mass data storage system.
Figure 2:
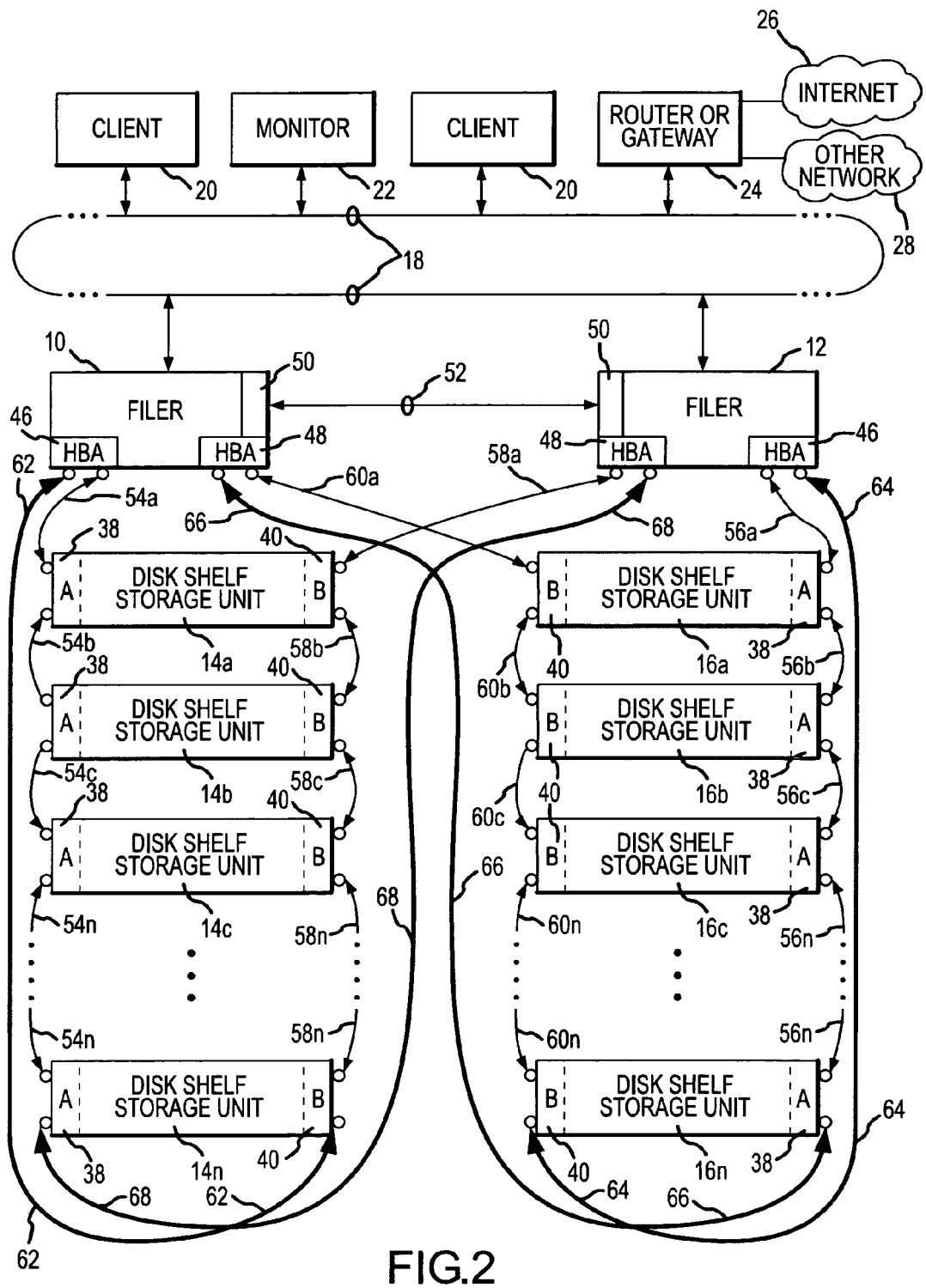
FIG. 2 is a block diagram showing different connectivity of a pair of filers and two groups of data storage units in accordance with the present invention, compared to the form of the invention shown in FIG. 1.

The present invention is implemented by the manner in which filers 10 and 12 are connected to groups of disk shelf data storage units 14 and 16, as shown in FIGS. 1 and 2, and the manner in which those filers interact and manage the data storage units. As described above, the term "filer" is used herein to refer to a data management computer device. The data storage units 14, which are principally associated with the filer 10, are further individually designated by different alphabetical designations appended to the reference number 14, i.e. 14a, 14b, 14c and 14n. Similarly, the data storage units 16 form a group which is principally associated with the filer 12. The data storage units 16 are also further and individually designated by different alphabetical designations appended to the reference number 16, i.e. 16a, 16b, 16c and 16n. Any number of data storage units 14 and 16 may form the groups which are principally associated with each of the filers 10 and 12, respectively, depending upon the data storage and communication capacity of each filer 10 and 12. The alphabetical designation "n" is intended to represent the last one, and the maximum number, of data storage units associated with each of the filers 10 and 12. However, each group need not have the same number of data storage units.

The n data storage units 14 in the group are serially connected to one another, and the serially connected group is connected to the filer 10, as is discussed in greater detail below. Similarly the n data storage units 16 in the group are serially connected to one another and to the filer 12. Under normal conditions, the filer 10 manages read and write operations only of the group of data storage units 14, and the filer 12 manages read and write operations only of the group of data storage units 16.

However, to provide greater redundancy, the filer 10 is also secondarily connected to the group of data storage units 16, and the filer 12 is secondarily connected to the group of data storage units 14. With the filers and the groups of data storage units connected in this manner, should a failure in functionality or connectivity between the filer 10 and its primarily associated data storage units 14 occur, thereby making read and write operations between the filer 10 and the data storage units 14 impossible or unreliable, the filer 12 will assume backup or redundancy management of its secondarily associated data storage units 14 for the purpose of managing read and write operations to the data storage units 14 while also maintaining management of its primarily associated data storage units 16. Similarly, the filer 10 will assume backup or redundancy management of its secondarily connected data storage units 16 while also maintaining management of its primarily associated data storage units 14 under conditions of a failure in functionality or connectivity between the filer 12 and its primary storage units 16. This takeover of management of the secondarily associated data storage units due to a failure is referred to as a "failover."

Partnering at least two filers 10 and 12 and establishing primary and secondary communication pathways from those partnered filers to the principally and secondarily associated groups of data storage units creates a failover clustered mass data storage system. Details of such cluster configurations are described more completely herein and in the previous referenced patents and applications. Although FIG. 1 shows a clustered configuration involving two filers 10 and 12 and their principally and secondarily associated groups of data storage units 14 and 16, any number of filers and groups of associated data storage units could be employed in a failover cluster, so long as a partnering or backup relationship is established between pairs of filers and primary and secondary communication pathways are established between the partnered pairs of filers and the associated groups of data storage units.

As is typical in most large mass storage computer systems, each filer 10 and 12 is connected to a node of a data communication network generally represented at 18. The data communication network may be a local-area network, a wide area network, a wireless network, a storage network or any other typical and well-known network which provides for data communication between nodes of that network. Each failover cluster configuration therefore consumes at least two nodes of the network 18, or more nodes if more than two filers are connected in the cluster. Each filer 10 and 12 is available to communicate data to clients 20 which are also connected as nodes of the network 18. A client 20 may be any type of computer processing unit which reads and writes data communicated by the filers connected as nodes to the network 18. In general, communications with clients or other nodes of the network 18 are achieved when the filer executes a network communication software module while data management functions with the data storage units are achieved when the filer executes a data management software module. The data management software module is included in the data storage operating system executed by each filer, but the network communications software module may be separate from or included within the data storage operating system. An example of a data storage operating system executed by each filer is Data ONTAP®, which is available through assignee of this invention. In general, the filers 10 and 12, and the clients 20, function in a traditional server-client communication relationship.

A monitor 22 is typically attached as a node of the network 18. The monitor 22 permits a network administrator to view administrative messages and other information presented by the various devices attached as other nodes of the network 18 and to comprehend the extent of proper functionality of the devices connected as nodes of the network. Furthermore, a typical network 18 may include a router or gateway 24 by which information is transferred between the network 18 and a different network, such as the internet 26 or another network 28. The use of the router or gateway 24 allows the data managed by the filers 10 and 12 to be communicated to other clients or devices connected to these other networks. The details of the network 18 described herein are well-known and have been generalized for the purpose of illustrating the interaction of the present invention with an exemplary communication network for mass data storage and management purposes.

Figure 3:
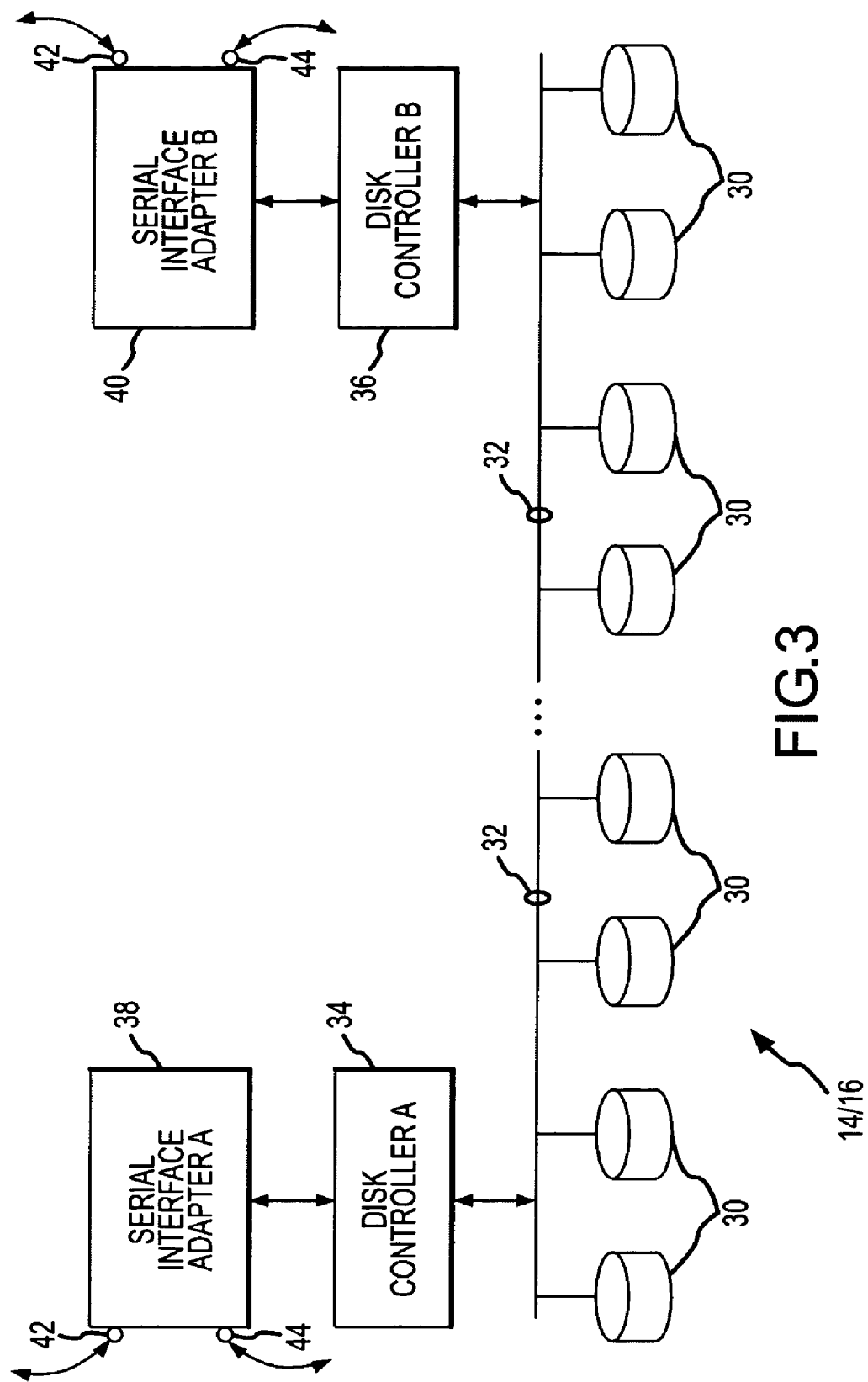
FIG. 3 is a block diagram of one example of a disk shelf data storage unit of the mass data storage system shown in FIGS. 1 and 2.
Figure 4:
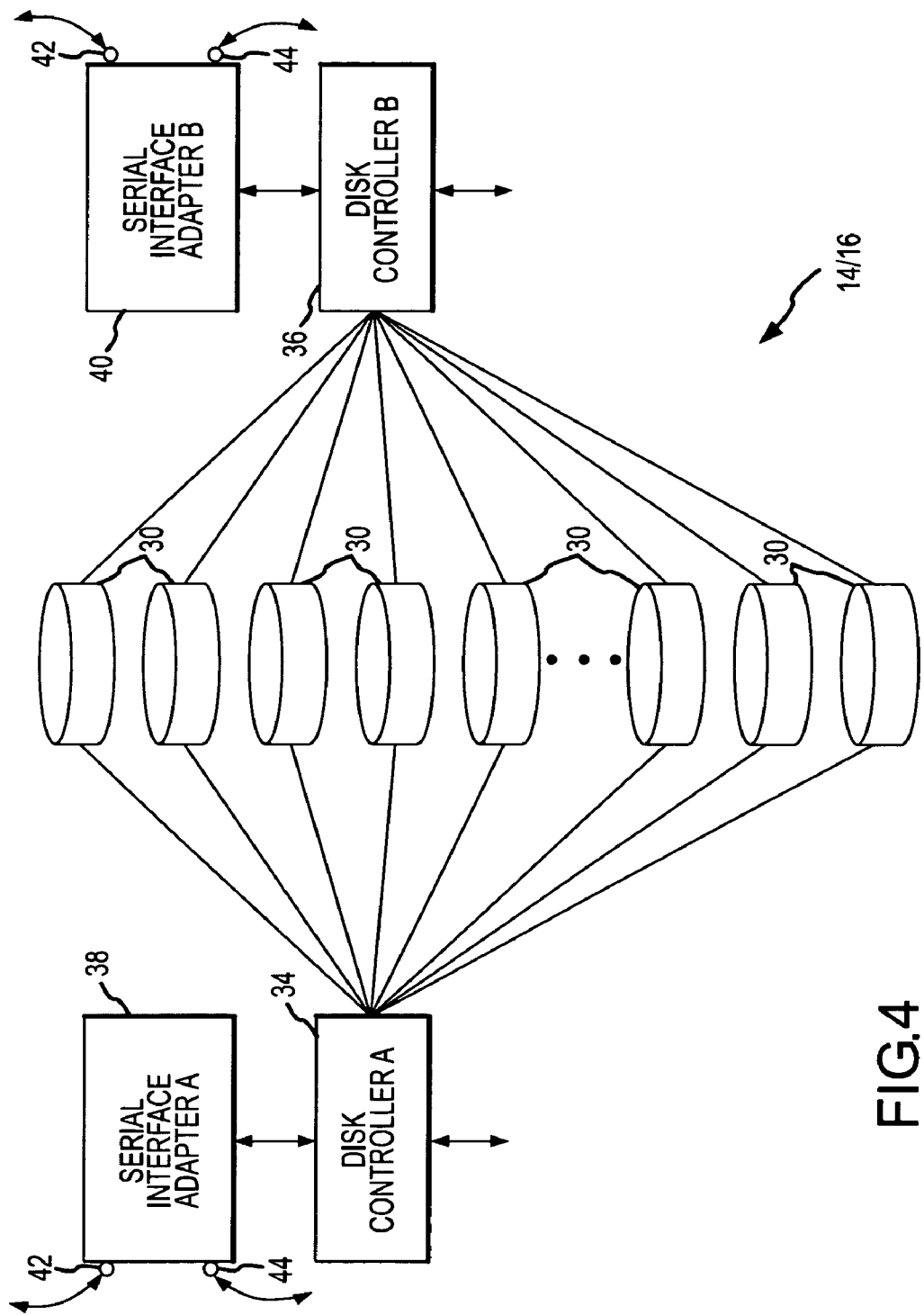
FIG. 4 is a block diagram of another example of a disk shelf data storage unit of the mass data storage system shown in FIGS. 1 and 2.

More details concerning each of the disk shelf data storage units 14 or 16 are shown in FIGS. 3 and 4. Each data storage unit 14 or 16 includes a plurality of data storage devices exemplified by conventional disk drives 30. The disk drives 30 are commonly connected to a bus 32 as shown in FIG. 3, or in a star or hub-like configuration as shown in FIG. 4. Control over the disk drives 30 is achieved by a first conventional disk controller 34 (designated disk controller A), which normally controls and performs read and write data communication operations with the disk drives 30 in accordance with instructions and data supplied by one of the filers 10 or 12 (FIG. 1).

The disk drives 30 are used to create storage "volumes," with each volume defining a logical arrangement of data storage space. A large number of discrete volumes can be created by the disk drives 30 and managed by each filer. Each volume is generally associated with its own filesystem. The disk drives 30 within a volume or filesystem are typically organized and controlled by the disk controller 34 as one or more random array of independent (or inexpensive) disks (RAID). As is known, RAID implementations enhance the availability and integrity of data storage through the redundant writing of data stripes across a number of physical disk drives 30 in the RAID group, and appropriate caching of parity information with respect to the striped data.

The data storage units 14 and 16 are referred to as disk shelf data storage units because the disk drives 30 for single data storage unit 14 or 16 are typically included in a single physical housing (not shown) and that housing is then typically inserted in a rack or shelf of a computer hardware enclosure support structure. Consequently the term "disk shelf" has been applied to describe the data storage units 14 and 16.

To assure redundancy, each disk shelf data storage unit 14 or 16 also includes a duplicate or secondary conventional disk controller 36 (designated disk controller B), which is also connected to the bus 32 (FIG. 3) or which is directly connected in the star or hub-like configuration (FIG. 4). The first and second disk controllers 34 and 36 are both capable of controlling and interacting with the disk drives 30 to perform read and write data communication operations. However the primary data communication operations are performed by the first disk controller 34 (disk controller A), except under failover conditions. Under failover conditions, the second disk controller 36 (disk controller B), controls and interacts with the disk drives 30 to perform the secondary read and write operations.

First and second serial interface adapters 38 and 40 are connected to the disk controllers 34 and 36, respectively. All data and instructions necessary to perform a write instruction are supplied by the filers 10 and 12 (FIGS. 1 and 2) to the first and second serial interface adapters 38 and 40 (designated serial interface adapters A and B, respectively). The serial interface adapters 38 and 40 communicate the write instructions to the disk controllers 34 and 36. All instructions necessary to perform a read instruction are supplied by the filers 10 and 12 (FIG. 1) to the first and second serial interface adapters 38 and 40 and/or communicated from the serial interface adapters 38 and 42 to the disk controllers 34 and 36. The data obtained from the disk drives 30 in response to the read instruction is supplied by the disk controllers 34 and 36 to the first and second serial interface adapters 38 and 40, respectively. Under normal operating conditions, the first serial interface adapter 38 functions as the primary serial interface adapter for communicating the primary data and the instructions to the principally associated group of data storage units, and therefore the first serial interface adapter 38 is also designated A. Under failover conditions, the other serial interface adapter 40 functions as a secondary interface adapter for communicating the data and instructions, and is therefore designated B.

Because each serial interface adapter 38 and 40 is intended to implement a serial connectivity or serial communication pathway between an adjoining data storage unit 14 or 16, or to a filer 10 or 12 (FIGS. 1 and 2), each serial interface adapter 38 and 40 includes two connection ports 42 and 44. Two connection ports 42 or 44 are necessary to implement the serial connectivity or communication: one port 42 or 44 is necessary to establish one serial link with one adjacent data storage unit or filer in the serial communication path, and the other port 44 or 42 is necessary to establish another serial link with the other adjacent data storage unit or filer in the serial communication path.

More details concerning the serial communication pathways established between the filers 10 and 12 and the disk shelf data storage units 14 and 16 are illustrated in FIGS. 1 and 2. Although physical serial connectivity links are illustrated in FIGS. 1 and 2, the present invention also contemplates any serial-like connectivity or serial-like communication pathways. Each filer 10 and 12 includes primary and secondary host bus adapters (HBA) 46 and 48, respectively. Like each of the serial interface adapters 38 and 40 (FIGS. 3 and 4), each host bus adapter 46 and 48 includes two connection ports. In addition, each filer 10 and 12 includes a dedicated communication interface 50. The dedicated interfaces 50 communicate signals between the partnered filers 10 and 12 over a dedicated communication path 52 which does not involve the network 18. Information concerning the proper functionality of each partnered filer 10 and 12 in the failover cluster configuration is communicated between the filers over the dedicated interfaces 50 and the dedicated communication path 52. A part of the information communicated over the interfaces 50 and communication path 52 includes a "heartbeat" or "keep-alive" message, the continued and regular delivery of which represents the proper functionality of the filer sending the message. Should one of the filers of the cluster experience a failure or difficulty in functionality, the necessity for the other filer to assume failover responsibility is communicated through the interfaces 50 and communication path 52 by the lack of heartbeat or keep-alive messages.

The data storage units 14 principally associated with the filer 10 are connected in the serial communication path by connecting and extending a data communication cable 54a between one of the ports of the primary host bus adapter 46 and one of the ports (42 or 44, FIGS. 3 and 4) of the first serial interface adapter 38 of the data storage unit 14a. An additional cable 54b serially connects the first serial interface adapter 38 of the storage unit 14a with the first serial interface adapter 38 of the data storage unit 14b, while a third cable 54c connects the first serial interface adapter 38 of the data storage unit 14b with the first serial interface adapter 38 of the data storage unit 14c. Furthermore, cables 54n are used in a similar manner to connect the first serial interface adapter 38 of the next-to-the-last data storage unit and the second serial interface adapter 40 of the last data storage unit 14n. The cables 54a-54n comprise a primary communication pathway connection of the filer 10 with its principally associated group of disk shelf data storage units 14a, 14b, 14c and 14n.

The data storage units 16 are connected in a similar manner as the data storage units 14. The data storage units 16 are principally associated with the filer 12 and are connected in a serial communication path by connecting a data communication cable 56a between one of the ports of the primary host bus adapter 46 and one of the ports (42 or 44, FIGS. 3 and 4) of the first serial interface adapter 38 of the data storage unit 16a. An additional cable 56b serially connects the first serial interface adapter 38 of the storage unit 16a with the first serial interface adapter 38 of the data storage unit 16b, while a third cable 56c connects the first serial interface adapter 38 of the data storage unit 16b with the first serial interface adapter 38 of the data storage unit 16c. Cables 56n connect the first serial interface adapter 38 of the next-to-the-last data storage unit and the second serial interface adapter 40 of the last data storage unit 16n.

The data storage units 16 are secondarily associated with the filer 10 and are connected in a secondary serial communication path with the filer 10 by connecting a cable 60a between one of the ports of the secondary host bus adapter 48 of the filer 10 and one of the ports (42 or 44, FIGS. 3 and 4) of the second serial interface adapter 40 of the data storage unit 16a. An additional cable 60b serially connects the second serial interface adapter 40 of the storage unit 16a with the second serial interface adapter 40 of the data storage unit 16b, while a third cable 60c connects the second serial interface adapter 40 of the data storage unit 16b with the second serial interface adapter 40 of the data storage unit 16c. Cables 60n are used in a similar manner to connect the second serial interface adapter 40 of the next-to-the-last data storage unit and the second serial interface adapter 40 of the last data storage unit 16n.

The data storage units 14 are secondarily associated with the filer 12 and are connected in a secondary serial communication path with the filer 12 by connecting and extending a cable 58a between one of the ports of the secondary host bus adapter 48 of the filer 12 and one of the ports (42 or 44, FIGS. 3 and 4) of the second serial interface adapter 40 of the data storage unit 14a. An additional cable 58b serially connects the second serial interface adapter 40 of the storage unit 14a with the second serial interface adapter 40 of the data storage unit 14b, while a third cable 58c connects the second serial interface adapter 40 of the data storage unit 14b with the second serial interface adapter 40 of the data storage unit 14c. Cables 58n are used in a similar manner to connect the second serial interface adapter 40 of the next-to-the-last data storage unit and the second serial interface adapter 40 of the last data storage unit 14n.

The present invention offers improvements in redundancy over previous cluster configurations by establishing redundant primary and redundant secondary serial communication pathways, illustrated by the redundancy cables 62, 64, 66 and 68. The redundant primary and secondary communication pathways are in addition to the main primary and secondary communication pathways established by cables 54, 56, 58 and 60 (including all of their subparts designated by alphabetical designations). The redundant primary and secondary communication pathways secure advantages and improvements that are not available from the previous cluster configurations. To achieve these improvements, the additional cables 62, 64, 66 and 68 connect to various ones of the interfaces of the serially connected groups of data storage units 14 and 16, as exemplified by FIGS. 1 and 2 and as described in greater detail below. In addition, a somewhat different process flow 98 (FIG. 5) is executed by each of the filers 10 and 12 to govern and control failover conditions.

By connecting the redundancy cables 62, 64, 66 and 68 to different ones of the interfaces of the serially connected data storage units 14 and 16 in each group, primary communication with each principally associated group of data storage units can be continued even though a break may occur in the primary or secondary serial connectivity of the groups of data storage units 14 and 16 with the filers 10 and 12. The necessity to place the filers 10 and 12 into a failover condition is also minimized, because a discontinuity in a main primary communication pathway is likely to be overcome by use of the redundant primary communication pathway. As a consequence, the present invention avoids placing the filers in a failover condition under many circumstances which necessarily required a failover condition in previous cluster configurations. By eliminating some failover conditions, the performance of the mass data storage system is maintained at its desired level, and the difficulty and disruption of restoring a failed-over cluster configuration to its original functional form after correction of the problem is avoided.

As shown in FIG. 1, and as understood from FIGS. 3 and 4, the redundancy cable 62 is connected from the unused port (42 or 44, FIGS. 3 and 4) of the first serial interface adapter 38 of the data storage unit 14n to the unused port of the primary host bus adapter 46 of the filer 10. The redundancy cable 64 is connected from the unused port of the first serial interface adapter 38 of the data storage unit 16n to the unused port of the primary host bus adapter 46 of the filer 12. In this manner, the redundancy cables 62 and 64 establish redundant primary communication pathways from the primary host bus adapters 46 of the filers 10 and 12 with the groups 14 and 16 of data storage units principally associated with those filers 10 and 12. Should a discontinuity occur in one of the main primary communication pathways 54 or 56 from the filers 10 or 12 to the principally associated groups 14 or 16 of data storage units, respectively, the redundant primary communication pathway cables 64 and 66 overcome that defect and still permit the filers 10 and 12 to continue managing read and write operations over a redundant primary communication pathway.

The benefit of the redundancy to the main primary communication pathways is shown by the following example. When a break or disconnection in one of the cables 54a-54n occurs, or one of the ports 42 or 44 (FIGS. 3 and 4) of the first serial interface adapters 38 or disk controllers 34 of the data storage units 14 fails, the primary communication path from the filer 10 to at least one of the data storage units 14 is interrupted. Before the failure, the filer 10 communicated with each of its principally associated data storage units 14 through the main primary communication pathway comprising the cables 54a-54n. After a single point of failure with any of the cables 54a-54n or ports 42 or 44 (FIGS. 3 and 4) of the first interface adapters 38, the filer 10 cannot use the main primary communication path to communicate with all of the data storage units 14. However, the filer 10 may continue to communicate with the data storage units 14 using the redundant primary communication pathway connector or cable 62 and the main primary communication pathway connectors or cables 54b-54n that lead up to the point of failure. Thus, while a previous single point failure in the main primary communication pathway, for example in cable 54b, would prohibit the filer 10 from accessing the data storage units 14b, 14c and 14n, the use of the redundant cable 62 permits the filer 10 to access the data storage units 14b, 14c and 14n using the redundant primary communication pathway, thereby overcoming the single point of failure without having to invoke a failover.

A similar situation exists by using the redundancy cables 66 and 68 to establish redundant secondary communication pathways between the filers 10 and 12 and their secondarily associated groups of data storage units 16 and 14, respectively. The redundancy cable 66 is connected from the unused port of the second serial interface adapter 40 of the data storage unit 16n to the unused port of the secondary host bus adapter 48 of the filer 10. The redundancy cable 68 is connected from the unused port of the second serial interface adapter 40 of the data storage unit 14n to the unused part of the secondary host bus adapter 48 of the filer 12.

Any breakage or discontinuity in any of the secondary communication pathways between the filers 10 and 12 and their secondarily associated groups of data storage units 16 and 14, respectively, is overcome by the use of the redundancy cables 68 and 66, in the same manner as has been illustrated and discussed above by the use of the redundancy cables 62 and 64 with respect to the main primary communication pathways from the filers. The benefits of the redundancy cables 66 and 68 occur under failover conditions where only one secondary communication pathway to the filer exists, and a discontinuity in this one secondary communication pathway would require the cluster configuration to cease managing read and write operation altogether. The redundancy cables 66 and 68 permit the cluster configuration to continue operation in this circumstance.

The failover benefits of the configuration shown in FIG. 1 are exemplified as follows. A failover will occur when any of the data storage units 14 is isolated from the filer 10 because neither the main primary communication pathway (54a-54n) nor the redundant primary communication pathway (62, 54b-54n) can access at least one of the data storage units 14. A failover will be necessary if the primary host bus adapter 46 of filer 10 fails, if any of the first serial interface adapters 38 fails (in which case both of its ports 42 and 44 (FIGS. 3 and 4) are inaccessible to the filer 10), if the filer 10 itself fails or becomes inoperative, or if more than one point of failure exists within the main and redundant primary communication pathways comprising the cables 54a-n and the redundancy cable 62. Under such circumstances, it will be impossible for the filer 10 to communicate with at least one of the data storage units 14, and a failover will occur.

Under failover conditions, the filer 12, which is the partner of or backup to the filer 10 in the cluster, assumes management of the read and write operations to the data storage units 14. The filer 12 accesses the data storage units 14 through a main secondary communication path comprising the cables 58a-58n. If a single point of failure exists within the main secondary communication path, for example a breakage in or discontinuity of the cable 58b, redundancy exists through a redundant secondary communication path established by the redundancy cable 68 and the cables 58c-58n that lead up to the point of failure, in this example. The redundant secondary communication pathway will be used by filer 12 to access the data storage units 14 up to the single point of failure, while the main secondary communication pathway 58a will be used to access the data storage unit 14a, in this example. Accordingly, a single point of failure through the failure of the main secondary communication pathway (cables 58a-58n) enables the filer 12 to continue to access the data storage units 14 through the redundant secondary communication pathway formed by the redundancy cable 68. In previous configurations, failover access to all of the secondarily associated data storage units 14 would not have been possible.

As shown in FIG. 1, a symmetry exists in the main and redundant primary and secondary communication pathways between the filers 10 and 12 and the groups of data storage units 14 and 16. Given this symmetry, the relationship of redundancy cables 64 and 66 associated with the filer 12 and the data storage units 16 is similar to that previously discussed for the redundancy cables 62 and 68 associated with the filer 10 and the data storage units 14.

The cluster configuration illustrated in FIG. 2 achieves additional and different advantages and improvements compared to the cluster configuration illustrated in FIG. 1. As shown in FIG. 2, the redundancy cable 62 extends from one of the ports of the primary host bus adapter 46 to one of the ports 42 or 44 (FIGS. 3 and 4) of the second serial interface adapter 40 of the last data storage unit 14n. The other port of the primary host bus adapter 46 receives the cable 54a attached to the first serial interface adapter 38. With this cable configuration, the primary host bus adapter 46 has access to the cables 54a-54n of the main primary communication path, and the cables 58b-58n of the redundant primary communication path through the redundancy cable 62.

The benefit of accessing both the serially connected cables 54a-54n and 58b-58n with the same primary host bus adapter 46 is exemplified in the situation where the first serial interface adapter 38 of the data storage unit 14b fails. In the configuration illustrated in FIG. 1, filer 10 could not access the unit 14b under any circumstances in this example and failover to the filer 12 was required. In the configuration illustrated in FIG. 2, the failover to the filer 12 is not required. When the first serial interface adapter 38 of the unit 14b fails, for example, the filer 10 loses access to the data storage units 14b-14n through the main primary communication path comprising the cables 54a-54n. However, the filer 10 can still access all of the data storage units 14a-14n through the redundant primary communication path established by the cables 58b-58n and the redundancy cable 62.

Although the cabling illustrated in FIG. 2 enables greater redundancy to avoid the failover by filer 12, situations exist where the failover cannot be avoided. For instance, if the filer 10 fails, then none of the data storage units 14 can be accessed using the main primary communication path (comprising cables 54a-54n) or the redundant primary communication path (comprising cables 62 and 58b-58n). In this situation, a failover occurs and the filer 12 accesses the data storage units 14 through the main secondary communication path comprising the cables 58a-58n.

In the event that a failure exists within the main secondary communication pathway (58a-58n), the filer 12 can access the data storage units 14 through the redundant secondary communication path (the redundancy cable 68 and the cables 54b-n). To create the redundant secondary communication path, the redundancy cable 68 runs from one of the ports of the secondary host bus adapter 48 of the filer 12 to one of the ports 42 or 44 (FIGS. 3 and 4) of the first serial interface adapter 38 of the last data storage unit 14n. With this cabling arrangement, if both the filer 10 and the second serial interface adapter 40 of the data storage unit 14b fail, for example, a failover will occur to the filer 12. The filer 12 will access the data storage unit 14a through the main secondary communication path comprising the cable 58a, and the filer 12 will access the data storage units 14b-14n through the redundant secondary communication pathway comprising the redundancy cable 68 and the cables 54c-54n, in this example.

Illustrated in FIG. 2 are four communication pathways for the filer 10 and its failover partner filer 12: the main primary communication path comprising the cables 54a-54n; the main secondary communication pathway comprising the cables 58a-58n; the redundant primary communication pathway comprising the redundancy cable 62 and the cables 58b-n; and the redundant secondary communication pathway comprising the redundancy cable 68 and the cables 54b-54n. The main primary communication pathway and the main secondary communication pathway shown in FIG. 2 are identical to those pathways shown in FIG. 1. The redundant primary communication pathway shown in FIG. 2 minimizes the probability that filer 12 must perform a failover in the event of a failure associated with the redundant primary communication pathway. The redundant secondary communication pathway shown in FIG. 2 increases the probability that the filer 12 can successfully execute the failover in the event of more than one communication pathway failure.

Again, the cluster configuration shown in FIG. 2 exhibits symmetry in the main and redundant primary and secondary communication pathways between the filers 10 and 12 and the groups of data storage units 14 and 16. Given this symmetry, the relationship of redundancy cables 64 and 66 associated with the filer 12 and the data storage units 16 is similar to that previously discussed for the redundancy cables 62 and 68 associated with the filer 10 and the data storage units 14.

Figure 5:
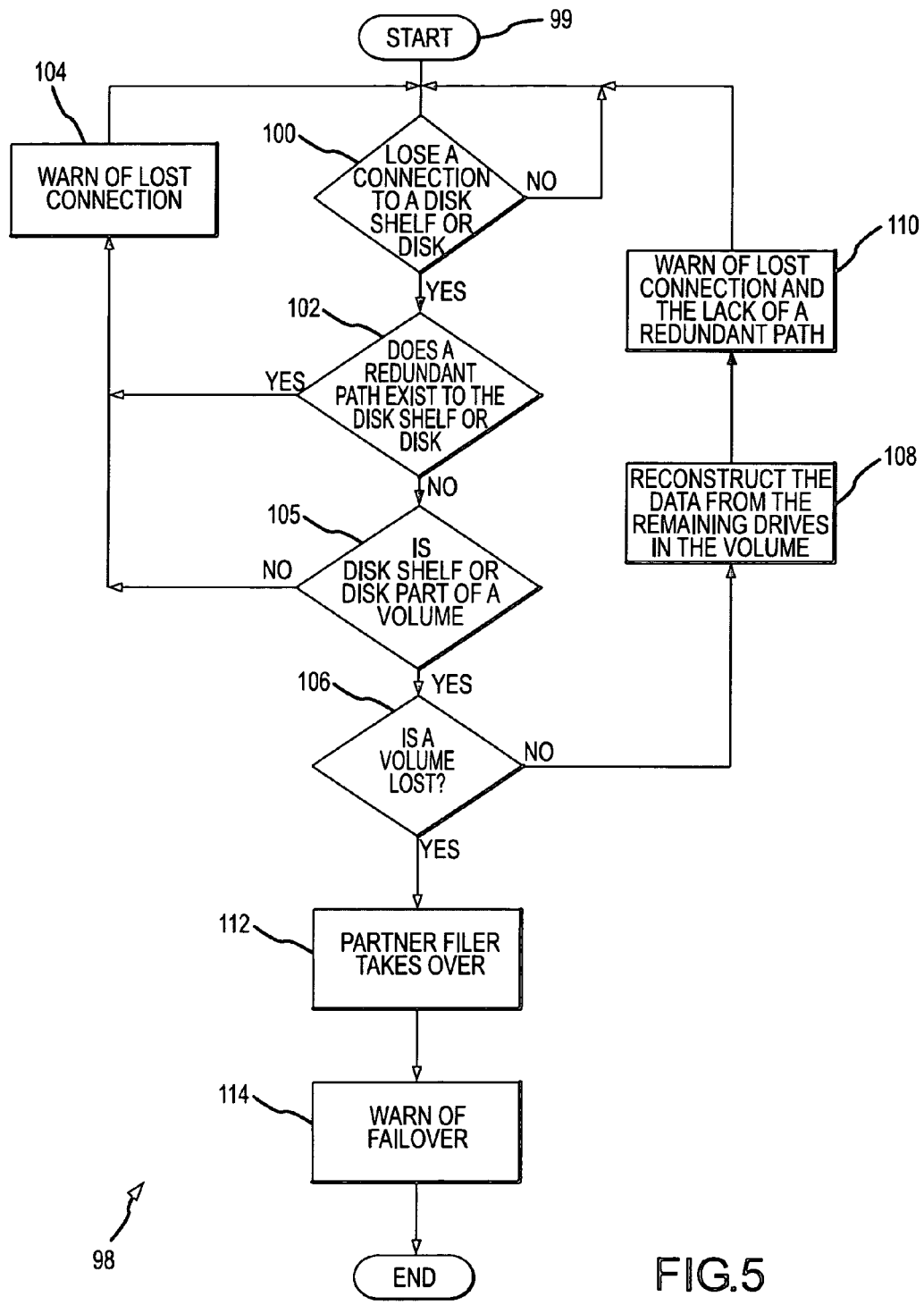
FIG. 5 is a flow chart diagram of process flow performed by the pair of filers in the mass data storage systems shown in FIGS. 1 and 2, to achieve redundancy in accordance with the present invention.

A process flow 98, shown in FIG. 5, is performed by each filer 10 and 12 (FIGS. 1 and 2) to exercise failover management in the event of a failure in a communication pathway. Each filer 10 and 12 executes the process flow 98 as an added part of its data storage operating system, for example the Data ONTAP® data storage operating system of the assignee of this invention. The failover management is communicated between the filers 10 and 12 over the dedicated communication interfaces 50 and the path 52 (FIGS. 1 and 2).

The failover process flow 98 begins at 99 and progresses to a determination at 100. The determination at 100 assesses whether an interruption in one of the primary communication pathways has occurred, arising from a broken or disconnected connector between a filer and one of the data storage units or between the data storage units, or from a failure of a first interface adapter 38 (FIGS. 3 and 4) of one of the data storage units, or from a failure of a first disk controller 34 (FIGS. 3 and 4) of one of the data storage units, or from a failure or disconnection of one of the disk drives 30 (FIGS. 3 and 4) of one of the data storage units. The filer initiates the determination 100 by sending interrogation signals through the main primary communication pathway comprising the cables 54a-54n or 56a-56n (FIGS. 1 and 2). Based upon the return signals generated by the first interfaces 38 and the first disk controllers 34 (FIGS. 3 and 4) and returned to the filer, any discontinuity in the main primary communication pathway can be ascertained. Similarly, the ones of the of the storage data units affected are determined. The determination 100 is performed on a continuously repeating basis to ensure that any lost connection is discovered immediately. So long as no lost connection or other discontinuity is detected, the process flow 98 continues in a loop represented by a negative determination at 100. However, if a discontinuity is detected, as represented by an affirmative determination at 100, the process flow 98 continues to a determination at 102.

The determination at 102 establishes whether a filer can access the data storage units affected by a lost primary communication pathway through a redundant primary communication pathway. The filer initiates the determination at 102 by sending interrogation signals through the redundant primary communication pathway. Based upon the return signals generated and returned to the filer, the availability of the redundant primary communication pathway is established. If a redundant secondary communication path is determined to exist based upon the return signals, as represented by an affirmative determination at 102, a warning is issued at 104 indicating the lost connection involving the main primary communication path to the affected data storage unit. The warning issued at 104 is displayed on the monitor 22 (FIGS. 1 and 2) where it can be observed by the network administrator. After issuing a warning at 104, the process flow returns to the determination at 100. The filer continues to operate and manage each of the primarily associated data storage units using both of the main primary and redundant primary communication pathways without invoking a failover.

If the determination at 102 is negative, indicating that the filer cannot communicate with at least one of the disk shelf data storage units or its disk drive data storage devices over either of the main primary and redundant primary communication pathways, the process flow 98 continues by executing a determination at 105. The determination at 105 is to establish whether the disk shelf or the disk drive is part of a volume. If the disk shelf or disk is not part of a volume, critical data may not have been lost, but the inability to communicate with the disk shelf or disk must be made known to the network administrator. The negative determination at 105 causes a warning communication at 104.

On the other hand, if the determination at 105 is affirmative, indicating a loss of data in a volume, a further determination is made at 106. The determination at 106 is relevant for failures which can be corrected because redundancy has been incorporated into the way data has been stored in volumes on the disk drives 30 (FIGS. 3 and 4). If, for instance, one of the disk drives fails, an assessment is made of whether the data associated with the lost disk drive can be recovered from the other disk drive contained within the data storage units by way of the main primary and redundant primary communication pathways that still exist. If so, a volume of the data has not been lost, as represented by a negative determination at 106. The process 98 then progresses to 108 where the data from the lost disk is recovered from other disk drives that contain the volume. With the successful recovery of the lost data at 108, a warning is issued at 110 that a connection has been lost through a failure in the main primary communication pathway and that the redundant primary communication pathway to the affected disk also does not exist, but that the data has been recovered without the necessity of a failover. The warning issued at 110 is displayed on the monitor 22 (FIGS. 1 and 2). After executing the actions 108 and 110, the filer continues to operate using the reconstructed data and the available communication pathway connections.

An affirmative determination at 106 indicates that both the main primary and redundant primary communication paths from the filer to the data storage units of the associated group have failed and the lost data cannot be recovered from any of the available or remaining data storage units of the group. In this situation, the filer signals its partner or backup filer to assume a failover and access the data storage units 14 (in this example) through the main secondary communication pathway. If necessary due to a failure within the main secondary communication pathway, the partner filer employs the redundant secondary communication pathway.

Upon the partner filer successfully executing the failover at 112, a warning is issued at 114 and communicated through the monitor 22 (FIGS. 1 and 2) that a failover was successfully executed. The warning issued at 114 further indicates that the principal filer has lost communication to its principally associated data storage units 14 through the failure of both the main and redundant primary communication pathways.

Although not shown in FIG. 5, the possibility exists that a failover by the filer was not successful. This would occur under circumstances of a failure in both the primary and redundant secondary communication pathways to the data storage units of the group associated with the principal filer. Under these circumstances of a failed failover, a warning will be issued and displayed on the monitor 22 (FIGS. 1 and 2) of that fact.

The improvements of the invention that minimize the risk of a failed primary or secondary serial communication pathway to the groups of data storage units associated with partnered filers in a cluster configuration. Consequently, redundancy is increased, and the increase in redundancy is achieved at relatively low cost compared to other more expensive techniques of matrix connections using fiber switches, for example. In addition, the improvements of the present invention reduce the circumstances when a failover is required. By reducing the number of failovers, the system performance is enhanced and less attention and effort is required to restore the clustered configuration to normal functionality after a correcting a discrepancy. The invention increases the probability of continued access to stored data in a mass data storage system. Many other improvements and advantages will be apparent upon gaining a complete appreciation of the invention.

Presently preferred embodiments of the invention and many of its improvements have been described with a degree of particularity. This description is of preferred examples of implementing the invention, and is not necessarily intended to limit the scope of the invention. The scope of the invention is defined by the following claims.

The invention claimed:

1. In a mass data storage system, an improvement comprising:
   a first data storage unit to which data storage operations are communicated, the first data storage unit including at least one data storage device which stores data, the first data storage unit including first and second interfaces to communicate the data storage operations to each data storage device of the first data storage unit;
   a second data storage unit to which data storage operations are communicated, the second data storage unit including at least one data storage device which stores data, the second data storage unit including first and second interfaces to communicate the data storage operations to each data storage device of the second data storage unit;
   a first filer which manages data storage operations of the first data storage unit, the first filer including first and second adapters for operatively communicating the data storage operations to the interfaces of the first and second data storage units;
   a second filer which manages data storage operations of the second data storage unit, the second filer including first and second adapters for operatively communicating the data storage operations to the interfaces of the first and second data storage units;
   a first main primary communication pathway connector extending from the first adapter of the first filer to the first interface of the first data storage unit;
   a first redundant primary communication pathway connector extending from the first adapter of the first filer to the second interface of the first data storage unit;
   a second main secondary communication pathway connector extending from the second adapter of the second filer to one of the first or second interfaces of the first data storage unit;
   a second redundant secondary communication pathway connector extending from the second adapter of the second filer to the one of the first or second interfaces of the first data storage unit other than the one interface to which the second main secondary communication pathway connector of the second filer is connected;
   a second main primary communication pathway connector extending from the first adapter of the second filer to the first interface of the second data storage unit;
   a second redundant primary communication pathway connector extending from the first adapter of the second filer to the second interface of the second data storage unit;
   a first main secondary communication pathway connector extending from the second adapter of the first filer to one of the first or second interfaces of the second data storage unit; and
   a first redundant secondary communication pathway connector extending from the second adapter of the first filer to the one of the first or second interfaces of the second data storage unit other than the one interface to which the first main secondary communication pathway connector from the first filer is connected.

2. In a mass data storage system, an improvement comprising:
   a group of data storage units which are serially connected in a sequential data communication path in which data storage operations are communicated, each data storage unit including at least one data storage device which stores data, each data storage unit including first and second interfaces to communicate the data storage operations to each data storage device of the group;
   a first filer which manages data storage operations of the data storage units in the group, the first filer including an adapter for operatively communicating the data storage operations to the interfaces of the data storage units in the group;
   a second filer which also manages data storage operations of data storage units in the group, the second filer including an adapter for operatively communicating the data storage operations to the interfaces of the data storage units in the group;
   a main primary communication pathway connector extending from the adapter of the first filer to the first interface of one data storage unit in the group;
   a redundant primary communication pathway connector extending from the adapter of the first filer to one of the first or second interfaces of a data storage unit in the group other than the interface to which the main primary communication pathway connector is connected;
   a main secondary communication pathway connector extending from the adapter of the second filer to the second interface of one data storage unit in the group; and
   a redundant secondary communication pathway connector extending from the adapter of the second filer to one of the first or second interfaces of a data storage unit in the group other than the second interface to which the main secondary communication pathway connector is connected.

3. In a mass data storage system as defined in claim 1, further comprising:
   a first group of a plurality of the data storage units, the first group including the first data storage unit; and
   a second group of a plurality of the data storage units, the second group including the second data storage unit; and wherein:
   the first main and first redundant primary communication pathway connectors connect to different interfaces in the first group;
   the first main and first redundant secondary communication pathway connectors connect to different interfaces in the second group;
   the second main and second redundant primary communication pathway connectors connect to different interfaces in the second group; and
   the second main and second redundant secondary communication pathway connectors connect to different interfaces in the first group.

4. In a mass data storage system as defined in claim 1, further comprising:
   a first group of a plurality of the data storage units, the first group including the first data storage unit; and
   a second group of a plurality of the data storage units, the second group including the second data storage unit; and wherein:

the first main primary and second main secondary communication pathway connectors connect to different interfaces of the same data storage unit in the first group; and the first redundant primary and second redundant secondary communication pathway connectors connect to different interfaces of the same data storage unit in the first group.

5. In a mass data storage system as defined in claim 1, further comprising:

a first group of a plurality of the data storage units, the first group including the first data storage unit; and a second group of a plurality of the data storage units, the second group including the second data storage unit; and wherein:

the first and second main primary communication pathway connectors connect to first interfaces of the data storage units in the first and second groups, respectively; and the first and second redundant secondary communication pathway connectors connect to the second interfaces of the data storage units in the second and first groups, respectively.

6. In a mass data storage system as defined in claim 3, wherein:

the main and redundant primary communication pathway connectors connect to the first interfaces of different ones of the data storage units in the group.

7. In a mass data storage system as defined in claim 6, wherein:

the sequential data communication path connecting the data storage units in the group commences with a beginning data storage unit and ends with an ending data storage unit in the group;

the main primary communication pathway connector connects to the first interface of one of the beginning or ending data storage units in the group; and the redundant primary communication pathway connector connects to the first interface of the other one of the beginning or ending data storage units in the group.

8. In a mass data storage system as defined in claim 3, wherein:

the main primary communication pathway connector connects to the first interface of one of the data storage units in the group; and the redundant primary communication pathway connector connects to the second interface of one of the data storage units in the group.

9. In a mass data storage system as defined in claim 8, wherein:

the main and redundant primary communication pathway connectors are connected to the first and second interfaces of different ones of the data storage units in the group.

10. In a mass data storage system as defined in claim 9, wherein:

the sequential data communication path connecting the data storage units in the group commences with a beginning data storage unit and ends with an ending data storage unit in the group;

the main primary communication pathway connector connects to the first interface of one of the beginning or ending data storage units in the group; and the redundant primary communication pathway connector connects to the second interface of the other one of the beginning or ending data storage units in the group.

11. In a mass data storage system as defined in claim 1, wherein:

the first and second filers are connected together to communicate commands to establish one of the first and second filers to manage data storage operations of the first data storage unit;

the first filer communicates signals with the first data storage unit over the first main and first redundant primary communication pathway connectors to determine the integrity of the communication paths to the first data storage unit; and the first filer commands the second filer to assume management of data storage operations of the first data storage unit upon determining that the communication path to the first data storage unit through neither of the first main and first redundant primary communication pathway connectors exists.

12. In a mass data storage system as defined in claim 2, wherein:

the main and redundant secondary communication pathway connectors connect to the second interfaces of different ones of the data storage units in the group.

13. In a mass data storage system as defined in claim 12, wherein:

the sequential data communication path connecting the data storage units in the group commences with a beginning data storage unit and ends with an ending data storage unit in the group;

the main secondary communication pathway connector connects to the second interface of one of the beginning or ending data storage units in the group; and the redundant secondary communication pathway connector connects to the second interface of the other one of the beginning or ending data storage units in the group.

14. In a mass data storage system as defined in claim 2, wherein:

the main secondary communication pathway connector connects to the second interface of one of the data storage units in the group; and the redundant secondary communication pathway connector connects to the first interface of one of the data storage units in the group.

15. In a mass data storage system as defined in claim 14, wherein:

the main and redundant secondary communication pathway connectors are connected to the second and first interfaces of different ones of the data storage units in the group.

16. In a mass data storage system as defined in claim 15, wherein:

the sequential data communication path connecting the data storage units in the group commences with a beginning data storage unit and ends with an ending data storage unit in the group;

the main secondary communication pathway connector connects to the second interface of one of the beginning or ending data storage units in the group; and the redundant secondary communication pathway connector connects to the first interface of the other one of the beginning or ending data storage units in the group.

17. In a mass data storage system, an improvement comprising:

a group of data storage units which are serially connected in a sequential data communication path in which data storage operations are communicated, each data storage unit including at least one data storage device which stores data, each data storage unit including first and second interfaces to communicate the data storage operations to each data storage device of the group;

a first filer which is operative to manage data storage operations of the data storage units in the group, the first filer including an adapter for operatively communicating the data storage operations to the interfaces of the data storage units in the group;

a second filer which is also operative to manage data storage operations of the data storage units in the group, the second filer including an adapter for operatively communicating the data storage operations to the interfaces of the data storage units in the group;

a main primary communication pathway connector extending from the adapter of the first filer to the first interface of one data storage unit in the group;

a redundant primary communication pathway connector extending from the adapter of the first filer to one of the first or second interfaces of a data storage unit in the group other than the interface to which the main primary communication pathway connector is connected;

a main secondary communication pathway connector extending from the adapter of the second filer to the second interface of one data storage unit in the group; and wherein:

the first and second filers are connected to communicate commands to establish one of the first and second filers to manage data storage operations of the data storage units in the group;

the first filer communicates signals with each data storage unit in the group over the main and redundant primary communication pathway connectors to determine the integrity of the sequential data communication path to each data storage unit of the group through the main and redundant primary communication pathway connectors; and the first filer commands the second filer to assume management of data storage operations of the data storage units in the group upon determining that the sequential data communication path to each data storage unit of the group through neither of the main and redundant primary communication pathway connectors exists.

18. In a mass data storage system as defined in claim 17, wherein:

the first filer commands the second filer to assume management of data storage operations only upon further determining that a volume of data written to the data storage devices of the group can not be reconstructed from data storage operations performed to the data storage devices of the group that remain accessible.

19. In a mass data storage system as defined in claim 2, wherein:

the aforesaid plurality of data storage units constituting a first group of data storage units;

the aforesaid main primary communication pathway connector extending from the adapter of the first filer to the first interface of one data storage unit in the first group constituting a first main primary communication pathway connector;

the aforesaid redundant primary communication pathway connector extending from the adapter of the first filer to one of the first or second interfaces of a data storage unit in the first group other than the interface to which the first main primary communication pathway connector is connected constituting a first redundant primary communication pathway connector;

the aforesaid main secondary communication pathway connector extending from the adapter of the second filer to the second interface of one data storage unit in the first group constituting a second main secondary communication pathway connector; and the aforesaid redundant secondary communication pathway connector extending from the adapter of the second filer to one of the first or second interfaces of a data storage unit in the first group other than the second interface to which the second main secondary communication pathway connector is connected constitutes a second redundant secondary communication pathway connector; and further comprising:

a second group of data storage units which are serially connected in a sequential data communication path in which data storage operations are communicated, each data storage unit in the second group including at least one data storage device which stores data, each data storage unit in the second group including first and second interfaces to communicate the data storage operations to each data storage device of the data storage unit in the second group;

a second main primary communication pathway connector extending from the adapter of the second filer to the first interface of one data storage unit in the second group;

a second redundant primary communication pathway connector extending from the adapter of the second filer to one of the first or second interfaces of a data storage unit in the second group other than the interface to which the second main primary communication pathway connector is connected;

a first main secondary communication pathway connector extending from the adapter of the first filer to one of the first or second interfaces of a data storage unit in the second group other than the interface to which the second main primary communication pathway connector is connected; and a first redundant secondary communication pathway connector extending from the adapter of the first filer to one of the first or second interfaces of a data storage unit in the second group other than the interface to which the first main secondary communication pathway connector is connected.

20. In a mass data storage system as defined in claim 19, wherein:

the second main and second redundant secondary communication pathway connectors connect to the second interfaces of different ones of the data storage units of the first group.

21. In a mass data storage system as defined in claim 20, wherein:

the sequential data communication path connecting the data storage units in each group commences with a beginning data storage unit and ends with an ending data storage unit in each group;

the first and second main secondary communication pathway connectors connect to the second interfaces of one of the beginning or ending data storage units in each group; and the first and second redundant secondary communication pathway connectors connect to the second interfaces of the other one of the beginning or ending data storage units in each group.

22. In a mass data storage system as defined in claim 19, wherein:

the first and second main secondary communication pathway connectors connect to the second interface of one of the data storage units in each group; and the first and second redundant secondary communication pathway connectors connect to the first interface of one of the data storage units in each group.

23. In a mass data storage system as defined in claim 19, wherein:
the first and second main and redundant secondary communication pathway connectors are connected to the second and first interfaces of different ones of the data storage units within each group.

24. In a mass data storage system as defined in claim 23, wherein:
the sequential data communication path connecting the data storage units in each group commences with a beginning data storage unit and ends with a ending data storage unit in each group;
the first and second main secondary communication pathway connectors connect to the second interface of one of the beginning or ending data storage units in each group; and
the first and second redundant secondary communication pathway connectors connect to the first interface of the other one of the beginning or ending data storage units in each group.

25. In a mass data storage system as defined in claim 19, wherein:
the first and second filers are connected to communicate commands to establish the one of the first and second filers to manage data storage operations of the data storage units in the first and second groups;
the first filer communicates signals with each data storage unit in the first group over the first main and first redundant primary communication pathway connectors to determine the integrity of the sequential data communication path to each data storage unit of the first group through the first main and first redundant primary communication pathway connectors;
the second filer communicates signals with each data storage unit in the second group over the second main and second redundant primary communication pathway connectors to determine the integrity of the sequential data communication path to each data storage unit of the second group through the second main and second redundant primary communication pathway connectors;
the first filer commands the second filer to assume management of data storage operations of the data storage units in the first group upon determining that the sequential data communication path to each data storage unit of the first group through neither of the first main and first redundant primary communication pathway exists; and
the second filer commands the first filer to assume management of data storage operations of the data storage units in the second group upon determining that the sequential data communication path to each data storage unit of the second group through neither of the second main and second redundant primary communication pathway exists.

26. In a mass data storage system as defined in claim 25, wherein:
the first filer commands the second filer to assume management of data storage operations of the data storage units of the first group upon further determining that a volume of data written to the data storage devices of the first group can not be reconstructed from data storage operations performed to the data storage devices of the first group that remain accessible; and
the second filer commands the first filer to assume management of data storage operations of the data storage units of the second group upon further determining that a volume of data written to the data storage devices of the second group can not be reconstructed from data storage operations performed to the data storage devices of the second group that remain accessible.

27. A method for enhancing redundancy in communication between at least one data storage unit in a group and a first filer and a second filer in a mass storage system, comprising:
creating a first serial communication pathway from the first filer with each data storage unit in the group;
creating a second serial communication pathway from the first filer with each data storage unit in the group, the second serial communication pathway having at least a portion which is different from the first serial communication pathway;
communicating data storage operations over the first serial communication pathway between the first filer and all of the data storage units in the group;
detecting a failure in communicating the data storage operations over the first serial communication pathway between the first filer and any data storage unit in the group, and thereafter communicating data storage operations over the second communication pathway between the first filer and the data storage units in the group;
creating a third serial communication pathway from the second filer with each data storage unit in the group, the third serial communication pathway having at least a portion which is different from the first and second serial communication pathways;
detecting a failure in communicating the data storage operations over the second serial communication pathway between the first filer and any data storage unit in the group, and thereafter communicating data storage operations over the third serial communication pathway between the second filer and the data storage units in the group.

28. A method as defined in claim 27, further comprising:
creating a fourth serial communication pathway from the second filer with each data storage unit in the group, the fourth serial communication pathway having at least a portion which is different from the first, second and third serial communication pathways;
detecting a failure in communicating the data storage operations over the third serial communication pathway between the second filer and any data storage unit in the group, and thereafter communicating data storage operations over the fourth serial communication pathway between the second filer and the data storage units in the group.

29. A method as defined in claim 27, further comprising:
including a plurality of data storage units in the serial communication path in the group;
storing data in a volume on a plurality of the data storage units in the group;
attempting to reconstruct data which has become inaccessible due to the failure of the first and second serial communication pathways by accessing other data storage units that remain accessible to the first filer through the first and second serial communication pathways before communicating the data storage operations over the third serial communication pathway between the second filer and the data storage units in the group; and
continuing to communicate the data storage operations over the first and second serial communication pathways without communicating the data storage operations over the third serial communication pathway so long as no data in a volume becomes inaccessible.

30. A method as defined in claim 29, further comprising:
including a plurality of data storage units in the serial communication path in the group;
including at least one data storage device in each data storage unit, each data storage device storing data;
including a pair of interfaces in each data storage unit which each communicate the data storage operations to each data storage device of each data storage unit;
serially linking each of the first ones of the interfaces of all data storage units in the group as part of at least one communication pathway;
serially linking each of the second ones of the interfaces of all the data storage units in the group as part of at least one communication pathway;
principally communicating the data storage operations to the first interfaces of the data storage units in the group; and
connecting the first serial communication pathway to one of the first interfaces.

31. A method as defined in claim 30, further comprising:
connecting the second serial communication pathway to one of the first interfaces which is different from the first interface to which the first serial communication pathway is connected.

32. A method as defined in claim 30, wherein the serially linked data storage units in the group commence with a beginning data storage unit and end with an ending data storage unit in communication sequence in the group, the method further comprising:
connecting the first serial communication pathway to the first interface of one of the beginning or ending data storage units in the group; and
connecting the second serial communication pathway to the first interface of the other one of the beginning or ending data storage units in the group.

33. A method as defined in claim 30, further comprising:
connecting the second serial communication pathway to a second interface of a data storage unit in the group.

34. A method as defined in claim 30, further comprising:
connecting the third serial communication pathway to one of the second interfaces of the data storage units in the group;
detecting a failure in communicating the data storage operations over the second serial communication pathway between the first filer and any data storage unit in the group, and thereafter communicating data storage operations over the third serial communication pathway between the second filer and the data storage units in the group.

35. A method as defined in claim 34, further comprising:
creating a fourth serial communication pathway from the second filer with each data storage unit in the group, the fourth serial communication pathway having at least a portion which is different from the first, second and third serial communication pathways;
connecting the fourth serial communication pathway to one of the interfaces which is different from the interface to which the third serial communication pathway is connected;
detecting a failure in communicating the data storage operations over the third serial communication pathway between the second filer and any data storage unit in the group, and thereafter communicating data storage operations over the fourth serial communication pathway between the second filer and the data storage units in the group.

36. A method as defined in claim 35, further comprising:
connecting the fourth serial communication pathway to one of the second interfaces.

37. A method as defined in claim 35, further comprising:
connecting the fourth serial communication pathway to one of the first interfaces,
a third serial communication pathway between a second filer and each of the data storage units, the third serial communication pathway having at least a portion different from the first and second communication pathways;
wherein upon a failure of the first and second serial communications pathways, communicating a data storage operation over the third serial communication pathway between the second filer and one of the data storage units using the third serial communication pathway.

38. In a mass data storage system as defined in claim 3, wherein:
the first group of data storage units are serially connected in a sequential data communication path in which the data management operations are communicated; and
the second group of data storage units are serially connected in a sequential data communication path in which the data management operations are communicated.

39. In a mass data storage system as defined in claim 4, wherein:
the first group of data storage units are serially connected in a sequential data communication path in which the data management operations are communicated; and
the second group of data storage units are serially connected in a sequential data communication path in which the data management operations are communicated.

40. In a mass data storage system as defined in claim 5, wherein:
the first group of data storage units are serially connected in a sequential data communication path in which the data management operations are communicated; and
the second group of data storage units are serially connected in a sequential data communication path in which the data management operations are communicated.

* * * * *